United States Patent
Bhatt et al.

(10) Patent No.: US 9,439,057 B2
(45) Date of Patent: Sep. 6, 2016

(54) REGISTRATION NOTIFICATION FOR SMS OVER LTE

(75) Inventors: Jay B. Bhatt, Naperville, IL (US); Yigang Cai, Naperville, IL (US); Gyan Shanker, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 224 days.

(21) Appl. No.: 12/571,385

(22) Filed: Sep. 30, 2009

(65) Prior Publication Data

US 2011/0077005 A1   Mar. 31, 2011

(51) Int. Cl.
*H04M 1/66* (2006.01)
*H04W 8/02* (2009.01)
*H04W 4/12* (2009.01)

(52) U.S. Cl.
CPC ............... *H04W 8/02* (2013.01); *H04W 4/12* (2013.01)

(58) Field of Classification Search
CPC ................................................... G06F 1/3228
See application file for complete search history.

(56) References Cited

U.S. PATENT DOCUMENTS

| | | |
|---|---|---|
| 2005/0124302 A1 | 6/2005 | Yoon et al. |
| 2005/0192007 A1 | 9/2005 | Kumar |
| 2006/0136560 A1 | 6/2006 | Jiang |
| 2007/0180037 A1* | 8/2007 | Cheng et al. ............... 709/206 |
| 2008/0200192 A1* | 8/2008 | Harris ........................ 455/466 |
| 2010/0105379 A1* | 4/2010 | Bonner et al. .............. 455/433 |
| 2011/0134843 A1* | 6/2011 | Noldus et al. .............. 370/328 |

FOREIGN PATENT DOCUMENTS

| | | |
|---|---|---|
| JP | 2005168019 A | 6/2005 |
| JP | 2006121334 A | 5/2006 |
| JP | 2009038768 A | 2/2009 |
| WO | WO 2006/062900 A2 | 6/2006 |
| WO | PCT/US2010/050608 | 12/2010 |

OTHER PUBLICATIONS

Okabe International Patent Office—English Translation of Office Action dated May 31, 2013 and Office Action dated May 31, 2013—6 pages.
Espacenet, English Translation of Abstract—Foreign Patent Ref.2 JP 20090338768 (A), dated Feb. 19, 2009—2 pages.
Okabe International Patent Office—Partial English Translation of Foreign Patent Ref.2 JP 20090338768 (A)—6 pages.
Espacenet, English Translation of Abstract—Foreign Patent Ref.3 JP 2006121334 (A), dated Feb. 19, 2009—2 pages.
Okabe International Patent Office—Partial English Translation of Foreign Patent Ref.3 JP 2006121334 (A)—2 pages.

* cited by examiner

*Primary Examiner* — Shahriar Behnamian
(74) *Attorney, Agent, or Firm* — Capitol Patent & Trademark Law Firm, PLLC

(57) ABSTRACT

An LTE subscriber database pushes a registration notification to a SMSC or IP-SM-GW when subscriber registers/deregisters to LTE. The subscriber registration information is stored in local database. Thus, MT SMS may be delivered to a registered subscriber without querying the subscriber database each time for registration information. An exemplary apparatus includes an interface for receiving a registration status message for a mobile device over a broadband network, a subscriber database, and a control system for storing subscriber information in response to receipt of the registration status message and forwarding a notification of subscriber registration status including subscriber registration information to a first network device when the mobile device registers or deregisters to the broadband data network.

17 Claims, 2 Drawing Sheets

REGISTRATION NOTIFICATION FOR SMS OVER LTE

FIELD OF THE INVENTION

The invention is related to the field of communications and, in particular, to delivery of Short Message Service (SMS) and Multimedia Message Service (MMS) messages.

BACKGROUND INFORMATION

SMS is a communication protocol allowing the interchange of short text messages (e.g., 160 characters) between mobile devices. MMS is an extension of SMS allowing the interchange of messages of any length, which may also include multimedia content. Messaging has become such a popular mode of communication that certain mobile users use messaging more frequently than voice calls. Herein use of the term SMS will refer to 1) SMS; 2) MMS; and 3) collectively both SMS and MMS as necessary to delivery desired content between mobile devices.

SMS messages are presently transmitted over signaling channels of a voice network, such as over SS7 channels. A typical voice network includes a Radio Access Network (RAN) and a core network. The RAN provides an air interface to a mobile device. The core network connects the RAN to other networks, such as the Public Switched Telephone Network (PSTN) or another RAN. The core network includes a switching system and a subscriber database for serving the mobile device.

For instance, in a Universal Mobile Telecommunications System (UMTS) network, the switching system may comprise a Mobile Switching Center (MSC) and the subscriber database may comprise a Home Location Register (HLR). In an IP Multimedia Subsystem (IMS) network, the switching system may comprise a Call Session Control Function (CSCF) and the subscriber database may comprise a Home Subscriber database (HSS).

The core network also connects to a SMS Center (SMS-C). The SMS-C is the entity which performs the storing and forwarding SMS messages to and from mobile devices. As an example of delivery of a Mobile Terminated (MT) SMS message to a mobile device, in a UMTS network, the SMS-C receives an SMS message destined for the mobile device, and stores the SMS message. The SMS-C then queries the subscriber database (i.e., HLR or HSS) for routing information based on the location of the mobile device. Then, the SMS-C attempts to deliver the SMS message to the destination by routing the SMS message to the appropriate MSC through an SS7 channel. The MSC receives the SMS message from the SMS-C, and forwards the SMS message through the RAN to the mobile device using a signaling channel.

For delivery of a Mobile Originated (MO) SMS message, a sending party enters the content and intended destination (e.g., a phone number or an address) of the message into a mobile device, which sends the SMS message to the MSC over the RAN, again using a signaling channel. The MSC that is serving the mobile device receives the SMS message, and routes the SMS message to the SMS-C. The SMS-C stores the SMS message, and attempts to forward the SMS message to the destination, again querying the subscriber database (i.e., HLR or HSS) for routing information associated with the destination.

3rd Generation Partnership Project (3GPP) has finalized the Release 8 specifications of the Long Term Evolution (LTE) and the Evolved Packet Core (EPC) network architecture. The EPC is a multi-access core network based on the Internet Protocol (IP) that enables operators to deploy and operate one common packet core network for 3GPP radio access (e.g., LTE, 3G and 2G), non 3GPP radio access (e.g., High Rate Packet Data (HRPD), Wireless Local Area Network (WLAN), and Worldwide Interoperability for Microwave Access (WiMAX)), and fixed access (e.g., Ethernet, Digital Subscriber Line (DSL), cable, and fiber).

3GPP specifications rely on legacy SMS-C (including MMS-C) for messaging delivery attempt in the LTE/EPC network (i.e., the store and forward mechanism for message delivery described above) even when there are multiple radio access and non radio access available. Accordingly, conventional SMS over LTE will require a SMS-C or Internet-Protocol Short-Message Gateway (IP-SM-GW) to query the HSS or Authentication, Authorization and Accounting (AAA) Server on subscriber access status every time when delivering a SMS message.

SUMMARY

A high volume of SMS traffic on a network can cause problems. For example, each time an SMS message is received at a SMS-C, the SMS-C needs to query the subscriber database (i.e., HLR or HSS) to determine the routing information for the destination of the SMS message. When there is a high volume of SMS messages, a significant amount of messages are exchanged between the SMS-C and the subscriber database, which can reduce the overall operating speed of the network. Also, the signaling channels of network can become congested with SMS traffic, as SMS messages are transported over the signaling channels. Even further, the switching systems, such as an MSC or CSCF, have to handle each SMS message, which can cause congestion at the switching systems. A service provider may implement more switching systems to handle higher SMS loads, but the expense of implementing the additional switching systems is undesirable.

Likewise, in an LTE network, requiring a SMS-C or Internet-Protocol Short-Message Gateway (IP-SM-GW) to query HSS or AAA on subscriber access status each time delivery of a SMS message is to be attempted causes unnecessary traffic. During peaks of SMS traffic (e.g., during a special events that cause traffic surges like sporting events, the SuperBowl, a memorial service for a well-known music star and the like), such a requirement could bring a disaster to the network. Further, for a subscriber with an LTE access enabled handset and registered to a LTE network, delivery of a SMS message via an available radio or non radio access without querying subscriber database for subscriber routing information, and not invoking serving switch or IP application level call session control functions and applications will also significantly save network resource.

Exemplary embodiments described herein propose that subscriber databases (e.g., HSS and/or AAA) push a registration notification to SMS-C when a subscriber registers/deregisters to a LTE network. The SMS-C stores subscriber registration status in local database, permitting the delivery of SMS to a registered subscriber without querying the subscriber database (e.g., HSS/AAA) for each message to be delivered, thus reducing message traffic and congestion.

One exemplary apparatus permitting registration notification for SMS over LTE includes an interface for receiving a registration status message for a mobile device over a broadband network, a subscriber database, and a control system for storing subscriber information in response to receipt of the registration status message and forwarding a notification of subscriber registration status including subscriber registration information to a first network device when the mobile device registers or deregisters to the broadband data network.

In one embodiment, the apparatus is a Home Subscriber Server (HSS) or an Authentication, Authorization and Accounting (AAA) Server. The control system may be configured to establish an identity for the mobile device and to organize an authorization to access at least one type of service in another embodiment.

The subscriber database may include subscription-related information, such information associated with handling of calls, sessions, or a combination thereof. In one embodiment, the first network device is a Short Message Service Center (SMSC) or Internet-Protocol Short-Message Gateway (IP-SM-GW).

The subscriber registration information may include a subscriber identifier, an access type, a mobile Internet Protocol (IF) address, a mobile directory number (MDN), a Packet Data Network-Gateway-Internet Protocol (PDN-GW-IP) address, a registration timestamp, a deregistration timestamp, a registration status indicator, or some combination thereof. The first network device may be configured to store the subscriber registration information.

In one embodiment, the control system is configured to forward the notification of subscriber registration status to the first network device in response to receipt of the registration status message.

Exemplary embodiments described herein also include an SMS-C which attempts to send SMS messages over a broadband data network. The SMS-C does not need to query a subscriber database (i.e., HLR, HSS, AAA, etc.) each time an SMS message is received, which further reduces message traffic in the voice network.

In another exemplary embodiment, a Short Message Service Center (SMS-C) includes a subscriber registration database, a first interface, and a control system. The subscriber registration database is configured to store subscriber registration information for a mobile device in response to a change in registration status of the mobile device to a broadband data network. The first interface is configured to receive a Mobile Terminated (MT) SMS message destined for the mobile device. The control system is configured to store the MT SMS message, to identify a routing address for the mobile device over the broadband data network based on the subscriber registration information stored in the subscriber registration database, and to forward the MT SMS message through the interface to the mobile device over the broadband data network based on the routing address.

In another embodiment, the SMS-C includes a second interface configured to receive a status notice including the subscriber registration information when the mobile device registers or deregisters with the broadband data network thereby modifying the registration status of the mobile device.

The first interface may include a Session Initiation Protocol (SIP) interface for connect to the broadband network, with the control system being further configured to forward a SIP MESSAGE through the first interface to the broadband data network, wherein the SIP MESSAGE includes the MT SMS message.

In one embodiment, the control system is configured to forward the MT SMS message through the interface to the mobile device over the broadband data network based on the routing address without querying an external subscriber database. The control system may be configured forward the MT SMS message through the interface to the mobile device over the broadband data network based on the routing address only when the mobile device is in a registered state.

In one embodiment, the interface is configured to receive a Mobile Originated (MO) SMS message from the mobile device, and the control system is further configured to verify that the MO SMS message is valid by comparing header information of the MO SMS message with the subscriber registration information stored in the subscriber registration database, to identify a destination for the MO SMS message based on routing information stored in a routing database if the MO SMS message is valid, and to route the MO SMS message to the destination. The control system may validate the MO SMS message by comparing a mobile IP (MIP) address in a header of the MO SMS message with a MIP address of the mobile device as stored in the subscriber registration database. The control system may validate the MO SMS message by comparing a mobile directory number (MDN) in a header of the MO SMS message with an MDN of the mobile device as stored in the subscriber registration database.

An exemplary method includes receiving in a Short Message Service Center (SMS-C) subscriber registration information indicating a change in registration status for a mobile device to a broadband data network in response to occurrence of the change, storing the subscriber registration information in the SMS-C, receiving in the SMS-C a Mobile Terminated (MT) Short Message Service (SMS) message that is destined for the mobile device, storing the MT SMS message, identifying a routing address for the mobile device over the broadband data network based on the subscriber registration information in the SMS-C, and forwarding the MT SMS message to the mobile device over the broadband data network based on the routing address. The broadband data network may be an Evolution-Data Optimized (EVDO) network, a GSM/EDGE Radio Access Network (GERAN), a Universal Terrestrial Radio Access Network (UTRAN), an Evolved UTAN (E-UTRAN), and the like. Other exemplary embodiments may be described below.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein. It will thus be appreciated that those skilled in the art will be able to devise various arrangements that, although not explicitly described or shown herein, embody the principles of the invention and are included within the scope of the invention as recited by the claims and their equivalents.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. As used herein the description, the term "and" may be used in both the conjunctive and disjunctive sense and includes any and all combinations of one or more of an associated list of items. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof. In addition, descriptions referring to 'one', 'a' and 'another' embodiment do not all necessarily refer to a single embodiment.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
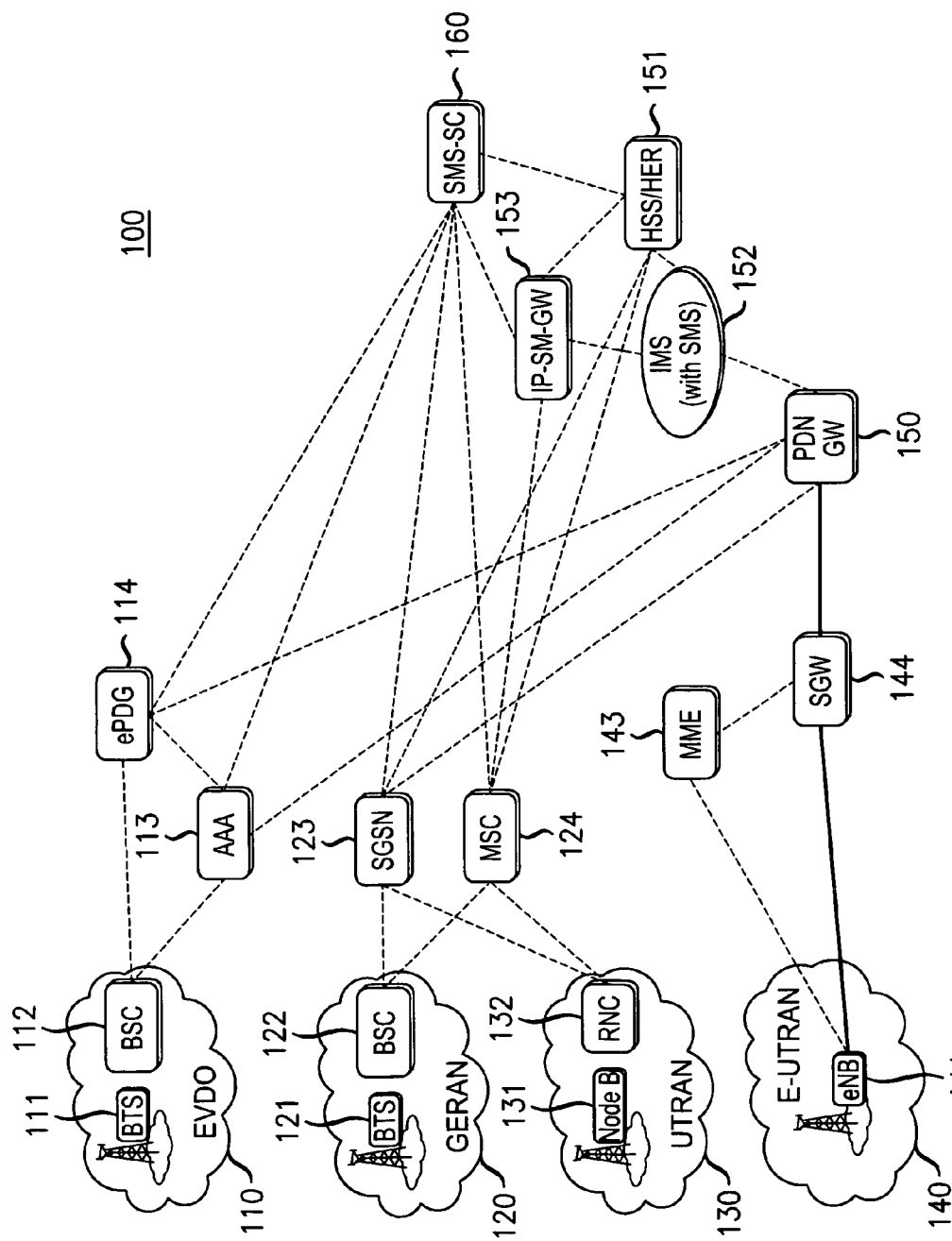
FIG. 1 illustrates an exemplary communication network according to an exemplary embodiment.

FIG. 1 illustrates an exemplary communication network according to an exemplary embodiment. 3GPP Technical Specifications (TS) 23.401 and 23.402 defined LTE network with 3GPP (E-UTRAN) and non-3GPP accesses. The network architecture integrating all of LTE, UMTS, 3G-MSC, and non 3GPP (EVDO here) networks can be summarized as illustrated in FIG. 1 with SMS-C and IP-SM-GW according to the invention as SMS delivering network elements. Note that SMS-C and IP-SM-GW can be one integrated network element and thus the description following hereafter may refers to both the SMS-C and IP-SM-GW elements as the SMS-C.

Referring to FIG. 1, communication network 100 includes Evolution-Data Optimized (EVDO) network (radio-part) 110, a GSM/EDGE Radio Access Network (GERAN) (radio-part) 120, a Universal Terrestrial Radio Access Network (UTRAN) (radio-part) 130, and an Evolved UTAN (E-UTRAN) (radio-part) 140. The EVDO permits wireless transmission of data through radio signals, and may be utilized to provide broadband Internet access. EVDO network (radio-part) 110 includes one or more Base Transceiver Station (BTS) 111 and Base Station Controller (BSC) 112. The BTS is responsible for radio transmission and reception in one or more cells to and from a mobile device (not shown). The mobile device comprises any user equipment or device operable to communicate via wireless signals, such as a mobile phone, a PDA, a mobile VoIP phone, etc. The BSC controls the BTS.

BSC interacts with Authentication, Authorization and Accounting (AAA) Server 113. The AAA includes authentication, authorization and accounting related functionality such as that for establishing a terminal's identity, configuring authorizations to access particular types of service, and monitoring traffic volumes for each mobile device. BSC also interacts with evolved Personal Digital Gateway (ePDG) 114 which enables multiple communications devices to share, transfer, and/or access standardized or otherwise compatible up-to-date personalized information.

The GERAN (radio part) 120 includes one or more Base Transceiver Station (BTS) 121 and Base Station Controller (BSC) 122. The BSC interacts with Serving GPRS Support Node (SGSN) 123, which is the interface between the radio system and the fixed network for Packet Switched (PS) services. The SGSN performs all necessary functions in order to handle packet transmission to and from the mobile stations. For each mobile station, the SGSN stores subscription and location information, including the cell or the Routing Area (RA) where the mobile station is registered. The BSC also interacts with Mobile Switching Centre (MSC) 124. The MSC typically is the interface between the radio system and the fixed networks, performing all necessary functions in order to handle Circuit Switched (CS) services to and from the mobile stations. As shown, the SGSN and MSC interact with Home Subscriber Server (HSS)/Home Location Register (HLR) 151 and SMS-C 160.

UTRAN 130 includes Radio Network Controllers (RNCs) 132 and NodeBs 131 of. For example a UMTS network, and allows connectivity between a mobile device and the core network. The RNC controls the use and the integrity of the radio resources. RNC interacts with SGSN 123 and MSC 124.

E-UTRAN 140 includes one or more eNodeBs 141, which provide the User-plane (Packet Data Convergence Protocol (PDCP), Radio Link Control (RLC), Medium Access Control (MAC) and PHYsical (PHY) layers) and Control-plane (Radio Resource Control (RRC)) protocol terminations towards the mobile device. The eNodeBs are connected by means of an interface to an Evolved Packet Core (EPC). As illustrated, the eNodeBs interact with Mobility Management Entity (MME) 143, which processes the signaling between the mobile device and the Core Network (CN) and provides Visitor Location Register (VLR) functionality for the Evolved Packet System (EPS). Serving GateWay (S-GW) 144 terminates the interface towards E-UTRAN. For each mobile device associated with the Evolved Packet System (EPS), at a given point in time, there is typically a single S-GW.

Packet Data Network Gateway (PDN-GW) is a network node that acts as a gateway through which a mobile device obtains a packet data connection to the interne. PDN-GW thus interacts with S-GW 144, SGSN 123, AAA 113, and ePDG 114.

HSS/HLR 151 is an network entity containing subscription-related information to support the network entities handling calls/sessions. The HSS/HLR supports the Packet Switched (PS) domain entities such as the SGSN 123, MME 143. It also supports Circuit Switched (CS) domain entities such as the Mobile Switching Centre (MSC). MSC enables subscriber access to services and supports roaming to legacy GSM/UMTS networks.

Internet Protocol Multimedia Subsystem (IMS) 152 is an architectural framework for delivering Internet Protocol (IP) multimedia services via UTRAN and E-UTRAN and includes IP-SM-GW 153.

Short Message Service Center (SMS-C) 150 enables SMS, the interchange of text and multimedia messages between mobile devices. SMS is similar to paging, except that it is a store-and-forward system and therefore does not require the mobile phone to be active and within range. Messages sent to a SMS-C may be stored and delivered to a mobile device when it is connected to the network.

In embodiments of SMS over a LTE network according to the invention, any access will allow subscribers to register to either the HSS or AAA. The registration data will include subscriber Mobile IP address, or a Serving-Call Session Control Function identifier (e.g., S-CSCF) when considering an IMS presence within the SMS over LTE network. In other SMS over LTE solutions, legacy HLR will provide subscriber registration data, but not necessarily subscriber Mobile IP address.

LTE Subscriber Registration Notification for SMS according to an exemplary embodiment includes the HSS and/or AAA updating subscriber registration status when a subscriber registers/deregisters to broadband network. HSS and AAA are examples of subscriber databases that maintain subscriber data for one or more subscribers. Subscriber databases are any database or similar system in LTE that stores or maintains subscriber information or subscriber data for one or more subscribers. Such data may be kept in the form of a subscriber records or subscriber profile for a user of a mobile device.

In addition, HSS and/or AAA according to embodiments of the invention will further update subscriber registration status to SMS-C and/or IP-SM-GW using a pushing notification. The subscriber registration data sent to SMS-C can be included in any appropriate protocols which are supportable. The appropriate protocol may depend on access type and network type.

Subscriber registration data may include a subscriber identifier, an access type, a mobile Internet Protocol (IP) address, a mobile directory number (MDN), a Packet Data Network-Gateway-Internet Protocol (PDN-GW-IP) address, a registration timestamp, a deregistration timestamp, and a combination thereof. In one embodiment, if there is no Operator's IP Service (e.g., IMS, PSS, etc.) involved in the network, then the notification data should at least include contain Subscriber identifier, Access Type, Mobile IP address, PDN-GW IP address, registration/deregistration timestamps. In another embodiment, if there is Operator's IP Service (e.g., IMS, PSS, etc.) involved in the network, then the notification data should at least include contain Subscriber identifier, Access Type, registration/de-registration timestamps.

The SMS-C will store subscriber registration data in a local dynamic database. Registration and deregistration timestamps may reflect subscriber registration status; in another embodiment, an explicit subscriber registration status flag may be included in the notification of subscriber registration status. In one embodiment, the SMS-C will only route MT SMS to broadband network when a mobile device is in registering state with the LTE network.

In the embodiments described below, SMS-C 106 is upgraded so that it is able to forward SMS messages directly over broadband data network 110, 120, 130 140 to a mobile device. Traditional SMS-C's are not data enabled, meaning that they are not able to forward messages directly over a broadband data network. Traditional SMS-C's are only able to forward SMS messages over a voice network by querying the subscriber database for routing information, and then forwarding the SMS message to the proper switching system based on the routing information using signaling such as MAP. The upgraded SMS-C 160 in the provided embodiments includes functionality enabling the forwarding of SMS messages directly to a mobile device over broadband data network without querying subscriber database (e.g., 113, 151) for routing information.

Figure 2:
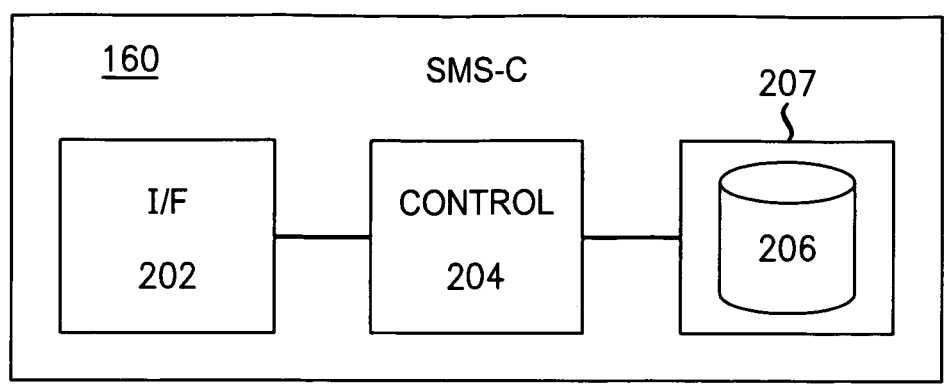
FIG. 2 illustrates a Short Message Service Center (SMS-C) in an exemplary embodiment.

FIG. 2 illustrates a Short Message Service Center (SMS-C) in an exemplary embodiment. In this embodiment, SMS-C 106 includes an interface 202, a control system 204, and a memory 207 including a subscriber registration database (DB) 206. Interface 202 comprises any device, component, or system configured to transmit and receive signaling messages that include SMS messages. For example, interface 202 may be capable to transmit and receive SIP messages, SS7 messages, etc. The interface is also configured to receive a registration status message including subscriber registration information when the mobile device registers or deregisters with the broadband data network.

Control system 204 comprises any device, component, or system configured to process signaling messages and/or SMS messages based on a store and forward mechanism, such as according to SMS protocol. Note SMS refers to SMS 1) SMS; 2) MMS; and 3) collectively both SMS and MMS as necessary to delivery the desired content (e.g., text, multimedia, text and multimedia) between mobile devices.

Subscriber registration database 206 comprises any storage system configured to store information regarding a registered subscriber within broadband data network 110, 120, 130, 140 (see FIG. 1). For example, subscriber registration database 206 may store a Mobile IP (MIP) for subscribers registered in the broadband data network/s.

SMS messages originated by a mobile device or destined for mobile device will be routed over a broadband data network. Before SMS messages can be sent over a broadband data network, mobile device first registers with this network. To register, mobile device transmits a register message, such as a SIP REGISTER, through EVDO 110 to AAA server 112. In response to the register message, AAA server 124 operates to authenticate mobile device, and set up a session for mobile device over broadband data network including EVDO radio part. The session established for mobile device is a data session, such as a Point-to-Point Protocol (PPP) session.

In addition to registering mobile device, AAA server 112 notifies SMS-C 160 of the session that was set up for mobile device in the event that an SMS message originates from or is sent to that mobile device. SMS-C 160 thus receives a notification message from AAA server 112 that a mobile device has registered with broadband data network 110 and a session has been set up (see FIG. 1). One example of the notification message is a SIP NOTIFY. The notification message may include a variety of information regarding the session. For example, the notification message may include a mobile directory number (MDN) for the mobile device, a Mobile IP (MIP) address for the mobile device, a session status indicator (i.e., active or inactive), and a timestamp (registration setup timestamp or registration release timestamp).

In response to the notification message, SMS-C 160 updates a subscriber profile for the mobile device based on the information provided in the notification message indicating a change in the registration status of the mobile device. As an example, SMS-C 160 may update a subscriber profile with the MIP address of mobile device for the PPP session. The SMS-C may also validate the subscriber information contained in the notification prior to updating the subscriber profile in its storage.

If mobile device 130 is registered via multiple networks 110, 120, 130 140, then SMS-C may process policies or criteria to make a determination of where to send the SMS message. The criteria may define a prioritized ordering of networks elements by which to attempt delivery of the SMS message. For example, the criteria may define that a) if the PDN-GW IP address is available, MT SMS will be routed to PDN GW; b) if Mobile IP (MIP) address is available, and subscriber registered in trusted non-3GPP access, MT SMS will be routed to PDN GW; c) if Mobile IP (MIP) address is available, and subscriber registered in non-trusted non-3GPP access, SMS will be routed to ePDG (In EVDO network, it will be routed to HA directly based on MIP address); d) if both PDN-GW IP address and MIP address are not available, but an IMS service is integrated in the network, SMS-C (and/or IP-SM-GW) will route MT SMS to IMS S-CSCF in the subscriber home network. (In this instance, SMS-C should provision a table of subscriber ID to home S-CSCF mapping locally; SMS-C may also query a Domain Name Server (DNS) to find the subscriber home S-CSCF). S-CSCF will route MT SMS to the appropriate P-CSCF (Note P-CSCF address is registered at S-CSCF when subscriber registers). The P-CSCF is able to locate subscriber MIP address which is available at P-CSCF when subscriber registers, and map to PDN-GW IP address. P-CSCF will finally route MT SMS to the appropriate PDN-GW.

In one example, control system 204 may identify the destination based on a pre-defined routing table. In another example, routing information, such as a routing table may be stored in memory 207. SMS-C 106 may be provisioned with an MDN routing table, and thus is able to identify the destination based on an MDN and the routing table. SMS-C 106 may thus forward the SMS message to the destination without having to query subscriber database 114 for routing information. After identifying the destination, control system 204 encapsulates the SMS message in the appropriate signaling message for delivery of the SMS message.

As described in the above embodiments, SMS traffic may be advantageously directed to a most appropriate broadband data network portion of the LTE network for delivery of the SMS message. The control offered permits advantageous loading and de-load of networks as desired. Further, the SMS-C 160 does not need to query subscriber database (e.g., 113, 151) each time an SMS message is received. This reduces message traffic in LTE network 100. With the reduced traffic, network 100 can maintain lower call setup times.

Note that when a session involving mobile device is torn down, the subscriber database (e.g., AAA, HSS/HLR) notifies the SMS-C 160 of this event. A session involving mobile device may be torn down for a variety of reasons, such as mobile device being powered off, traveling out of the service area of EVDO network, etc. The provided embodiments thus provide an innovative solution for SMS over LTE network with external subscriber database that proactively pushes a subscriber registration notification to SMS-C. The SMS-C stores, updates, and cleans subscriber registration/deregistration data locally. SMS-C (and IP-SM-GW) will determine MT SMS routing type and destination based on subscriber registration data. The SMS-C is thus able to deliver SMS to a subscriber if the subscriber is registered in an LTE broadband data network without querying an external subscriber database.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

What is claimed is:

1. A subscriber database, the database configured to:
   store subscriber information for a mobile device in response to receipt of a registration status message;
   update a profile or record associated with the registration status of the mobile device; and
   automatically forward a pushed notification indicating the updated registration status of the mobile device to a Short Message Service Center (SMSC) or Internet-Protocol Short-Message Gateway (IP-SM-GW) to enable the SMSC or IP-SM-GW to forward a Mobile Terminated (MT), Short Message Service (SMS) message to a mobile device without querying the database.

2. The database of claim 1 wherein the database comprises a Home Subscriber Server (HSS) or an Authentication, Authorization and Accounting (AAA) Server.

3. The database of claim 1 wherein the database is configured to establish an identity for the mobile device and to organize an authorization to access at least one type of service.

4. The database of claim 1 wherein the database comprises subscription-related information, the subscription-related information associated with handling of calls, sessions, or a combination thereof.

5. The database of claim 1 wherein the pushed notification further comprises a subscriber identifier, an access type, a mobile Internet Protocol (IP) address, a mobile directory number (MDN), a Packet Data Network-Gateway-Internet Protocol (PDN-GW-IP) address, a registration timestamp, and a deregistration timestamp.

6. A Short Message Service Center (SMS-C) comprising:
   a local database configured to store subscriber registration information for a mobile device based on a push notification from an apparatus including a database of subscriber registration information in response to a change in registration status of the mobile device to a broadband data network;
   a first interface configured to receive a Mobile Terminated (MT) SMS message destined for the mobile device; and
   a control system configured to store the MT SMS message, to identify a routing address for the mobile device over the broadband data network based on the subscriber registration information stored in the local database, and to forward the MT SMS message through the interface to the mobile device over the broadband data network based on the routing address without querying any of a Home Subscriber Server (HSS), a Home Location Register (HLR), or an Authentication, Authorization and Accounting (AAA) Server.

7. The SMS-C of claim 6 further comprising:
a second interface configured to receive a status notice including the subscriber registration information when the mobile device registers with the broadband data network and when the mobile device deregisters with the broadband data network thereby modifying the registration status of the mobile device.

8. The SMS-C of claim 6 wherein the first interface comprises a Session Initiation Protocol (SIP) interface for connect to the broadband data network, and the control system is further configured to forward a SIP MESSAGE comprising the MT SMS message through the first interface to the broadband data network.

9. The SMS-C of claim 6 wherein the control system is configured to forward the MT SMS message through the interface to the mobile device over the broadband data network based on the routing address without querying an external subscriber database.

10. The SMS-C of claim 6 wherein the control system is configured to forward the MT SMS message through the interface to the mobile device over the broadband data network based on the routing address only when the mobile device is in a registered state with the broadband data network.

11. The SMS-C of claim 6 wherein the interface is further configured to receive a Mobile Originated (MO) SMS message from the mobile device, and the control system is further configured to (i) verify that the MO SMS message is valid by comparing header information of the MO SMS message with the subscriber registration information stored in the local subscriber registration status database, (ii) identify a destination for the MO SMS message based on routing information stored in a routing database if the MO SMS message is valid, and (iii) to route the MO SMS message to the destination.

12. The SMS-C of claim 6 wherein the control system is further configured to validate the MO SMS message by comparing a mobile IP (MIP) address in a header of the MO SMS message with a MIP address of the mobile device as stored in the local subscriber registration status database.

13. The SMS-C of claim 6 wherein the control system is further configured to validate the MO SMS message by comparing a mobile directory number (MDN) in a header of the MO SMS message with an MDN of the mobile device as stored in the local subscriber registration status database.

14. A method comprising:
receiving, at a Short Message Service Center (SMS-C), a pushed notification comprising subscriber registration information from a database, the notification indicating a change in a registration status of a mobile device to a broadband data network;
storing the subscriber registration information in the SMS-C;
receiving a Mobile Terminated (MT) Short Message Service (SMS) message that is destined for the mobile device at the SMS-C;
storing the MT SMS message at the SMS-C;
identifying a routing address for the mobile device over the broadband data network based on the subscriber registration information in the SMS-C; and
forwarding the MT SMS message to the mobile device over the broadband data network based on the routing address without querying a Home Subscriber Server (HSS), a Home Location Register (HLR), and an Authentication, Authorization and Accounting (AAA) Server.

15. The method of claim 14 wherein forwarding the MT SMS message to the mobile device over the broadband data network comprises:
forwarding a SIP MESSAGE from the SMS-C to the broadband data network, wherein the SIP MESSAGE comprises the MT SMS message.

16. The method of claim 14 further comprising:
receiving a Mobile Originated (MO) SMS message in the SMS-C from the mobile device;
verifying that the MO SMS message is valid by comparing header information of the MO SMS message with the subscriber registration information in the SMS-C;
identifying a destination for the MO SMS message based on a routing table if the MO SMS message is valid; and
routing the MO SMS message to the destination.

17. The method of claim 14 wherein the broadband data network comprises one of an Evolution-Data Optimized (EVDO) network, a GSM/EDGE Radio Access Network (GERAN), a Universal Terrestrial Radio Access Network (UTRAN), and an Evolved UTAN (E-UTRAN).

* * * * *